United States Patent
Lindenmeier et al.

(10) Patent No.: US 8,422,976 B2
(45) Date of Patent: Apr. 16, 2013

(54) ANTENNA DIVERSITY SYSTEM FOR RELATIVELY BROADBAND BROADCAST RECEPTION IN VEHICLES

(75) Inventors: Heinz Lindenmeier, Planegg (DE); Stefan Lindenmeier, Guating-Buchendorf (DE); Jochen Hopf, Haar (DE); Leopold Reiter, Gilching (DE)

(73) Assignee: Delphi Delco Electronics Europe GmbH, Troy, MI (US)

( * ) Notice: Subject to any disclaimer, the term of this patent is extended or adjusted under 35 U.S.C. 154(b) by 1142 days.

(21) Appl. No.: 12/170,816

(22) Filed: Jul. 10, 2008

(65) Prior Publication Data

US 2009/0042529 A1     Feb. 12, 2009

(30) Foreign Application Priority Data

Jul. 10, 2007     (DE) .................... 10 2007 032 048

(51) Int. Cl.
*H04B 1/10*     (2006.01)
(52) U.S. Cl.
USPC ........ 455/297; 455/135; 455/275; 455/277.2; 455/278.1
(58) Field of Classification Search .......... 455/132–148, 455/272–294, 296–312, 226.1–226.4
See application file for complete search history.

(56) References Cited

U.S. PATENT DOCUMENTS

| | | |
|---|---|---|
| 3,942,119 A | 3/1976 | Meinke et al. |
| 4,070,677 A | 1/1978 | Meinke et al. |
| 4,095,228 A | 6/1978 | Meinke et al. |
| 4,602,260 A | 7/1986 | Lindenmeier et al. |
| 4,752,968 A | 6/1988 | Lindenmeier et al. |
| 4,791,426 A | 12/1988 | Lindenmeier et al. |
| 4,914,446 A | 4/1990 | Lindenmeier et al. |
| 5,029,308 A | 7/1991 | Lindenmeier et al. |
| 5,049,892 A | 9/1991 | Lindenmeier et al. |
| 5,097,270 A | 3/1992 | Lindenmeier et al. |
| 5,138,330 A | 8/1992 | Lindenmeier et al. |
| 5,266,960 A | 11/1993 | Lindenmeier et al. |
| 5,289,197 A | 2/1994 | Lindenmeier et al. |
| 5,313,660 A | 5/1994 | Lindenmeier et al. |
| 5,589,839 A | 12/1996 | Lindenmeier et al. |
| 5,619,214 A | 4/1997 | Lindenmeier et al. |
| 5,801,663 A | 9/1998 | Lindenmeier et al. |
| 5,818,394 A | 10/1998 | Aminzadeh et al. |
| 5,826,179 A | 10/1998 | Lindenmeier et al. |
| 5,850,198 A | 12/1998 | Lindenmeier et al. |

(Continued)

OTHER PUBLICATIONS

U.S. Appl. No. 12/689,969, filed Jan. 19, 2010.

(Continued)

*Primary Examiner* — Edward Urban
*Assistant Examiner* — Rui Hu
(74) *Attorney, Agent, or Firm* — J. Gordon Lewis

(57) ABSTRACT

There is disclosed an antenna diversity system for relatively broadband broadcast reception in vehicles such as motor vehicles. The device can include a diversity processor having numerous components including a microprocessor for controlling a signal selection switch. In alternative embodiments the processor can be incorporated into a receiver or into a multi-antenna system. One advantage of these designs is that it is able to exist with one reception tuner and being able to select one signal from a plurality of antenna signals A1, A2, ... AN, with great probability, whose signal components lie above the level necessary for interference-free reception, over the entire channel bandwidth B.

23 Claims, 12 Drawing Sheets

U.S. PATENT DOCUMENTS

| | | |
|---|---|---|
| 5,905,469 A | 5/1999 | Lindenmeier et al. |
| 5,926,141 A | 7/1999 | Lindenmeier et al. |
| 5,929,812 A | 7/1999 | Aminzadeh |
| 5,949,498 A | 9/1999 | Rudolph |
| 5,973,648 A | 10/1999 | Lindenmeier et al. |
| 6,011,962 A | 1/2000 | Lindenmeier et al. |
| 6,123,550 A | 9/2000 | Burkert et al. |
| 6,130,645 A | 10/2000 | Lindenmeier et al. |
| 6,140,969 A | 10/2000 | Lindenmeier et al. |
| 6,169,888 B1 | 1/2001 | Lindenmeier et al. |
| 6,184,837 B1 | 2/2001 | Lindenmeier et al. |
| 6,188,447 B1 | 2/2001 | Rudolph et al. |
| 6,218,997 B1 | 4/2001 | Lindenmeier et al. |
| 6,219,532 B1* | 4/2001 | Tanaka et al. .................. 455/78 |
| 6,236,372 B1 | 5/2001 | Lindenmeier et al. |
| 6,313,799 B1 | 11/2001 | Thimm et al. |
| 6,317,096 B1 | 11/2001 | Daginnus et al. |
| 6,377,221 B1 | 4/2002 | Lindenmeier et al. |
| 6,400,334 B1 | 6/2002 | Lindenmeier et al. |
| 6,421,532 B1 | 7/2002 | Lindenmeier et al. |
| 6,430,404 B1* | 8/2002 | Lindenmeier et al. ........ 455/132 |
| 6,574,460 B1 | 6/2003 | Lindenmeier et al. |
| 6,603,434 B2 | 8/2003 | Lindenmeier et al. |
| 6,603,435 B2 | 8/2003 | Lindenmeier et al. |
| 6,611,677 B1* | 8/2003 | Lindenmeier et al. ........ 455/135 |
| 6,633,258 B2* | 10/2003 | Lindenmeier et al. ........ 342/374 |
| 6,653,982 B2 | 11/2003 | Lindenmeier et al. |
| 6,768,457 B2* | 7/2004 | Lindenmeier .................. 342/374 |
| 6,888,508 B2 | 5/2005 | Lindenmeier |
| 6,911,946 B2 | 6/2005 | Lindenmeier |
| 6,917,340 B2 | 7/2005 | Lindenmeier |
| 6,925,293 B2 | 8/2005 | Lindenmeier et al. |
| 6,927,735 B2 | 8/2005 | Lindenmeier et al. |
| 6,956,533 B2 | 10/2005 | Lindenmeier |
| 7,127,218 B2* | 10/2006 | Lindenmeier .................. 455/101 |
| 7,277,684 B2* | 10/2007 | Kushima et al. ........... 455/232.1 |
| 7,403,167 B2 | 7/2008 | Probst et al. |
| 7,555,277 B2* | 6/2009 | Lindenmeier et al. ..... 455/277.2 |
| 7,564,416 B2 | 7/2009 | Lindenmeier et al. |
| 7,702,051 B2 | 4/2010 | Lindenmeier et al. |
| 7,936,852 B2* | 5/2011 | Lindenmeier .................. 375/347 |
| 8,050,639 B2* | 11/2011 | Nakatani et al. .............. 455/134 |
| 2001/0016478 A1 | 8/2001 | Lindenmeier et al. |
| 2002/0118138 A1 | 8/2002 | Lindenmeier et al. |
| 2002/0126055 A1 | 9/2002 | Lindenmeier et al. |
| 2002/0154059 A1* | 10/2002 | Lindenmeier et al. ........ 342/374 |
| 2002/0171600 A1 | 11/2002 | Lindenmeier et al. |
| 2002/0196183 A1* | 12/2002 | Lindenmeier .................. 342/374 |
| 2003/0164802 A1 | 9/2003 | Lindenmeier |
| 2004/0113854 A1 | 6/2004 | Lindenmeier |
| 2004/0160373 A1 | 8/2004 | Lindenmeier |
| 2004/0164912 A1 | 8/2004 | Lindenmeier et al. |
| 2004/0183737 A1 | 9/2004 | Lindenmeier |
| 2004/0192242 A1* | 9/2004 | Dinur et al. .................... 455/272 |
| 2004/0198274 A1* | 10/2004 | Lindenmeier .................. 455/130 |
| 2006/0082494 A1 | 4/2006 | Deininger et al. |
| 2006/0114146 A1 | 6/2006 | Lindenmeier et al. |
| 2006/0182201 A1* | 8/2006 | Lindenmeier et al. ........ 375/332 |
| 2007/0058761 A1 | 3/2007 | Lindenmeier |
| 2007/0140389 A1 | 6/2007 | Lindenmeier et al. |
| 2008/0064356 A1* | 3/2008 | Khayrallah ................ 455/277.1 |
| 2008/0218422 A1 | 9/2008 | Lindenmeier et al. |
| 2008/0248770 A1 | 10/2008 | Schultz et al. |
| 2008/0260079 A1 | 10/2008 | Lindenmeier et al. |
| 2008/0293371 A1* | 11/2008 | Kishigami et al. ......... 455/278.1 |
| 2009/0036074 A1 | 2/2009 | Lindenmeier et al. |
| 2009/0073072 A1 | 3/2009 | Lindenmeier et al. |
| 2010/0066618 A1 | 3/2010 | Heuer |

OTHER PUBLICATIONS

U.S. Appl. No. 12/716,318, filed Mar. 3, 2010.
U.S. Appl. No. 12/786,236, filed May 24, 2010.

* cited by examiner

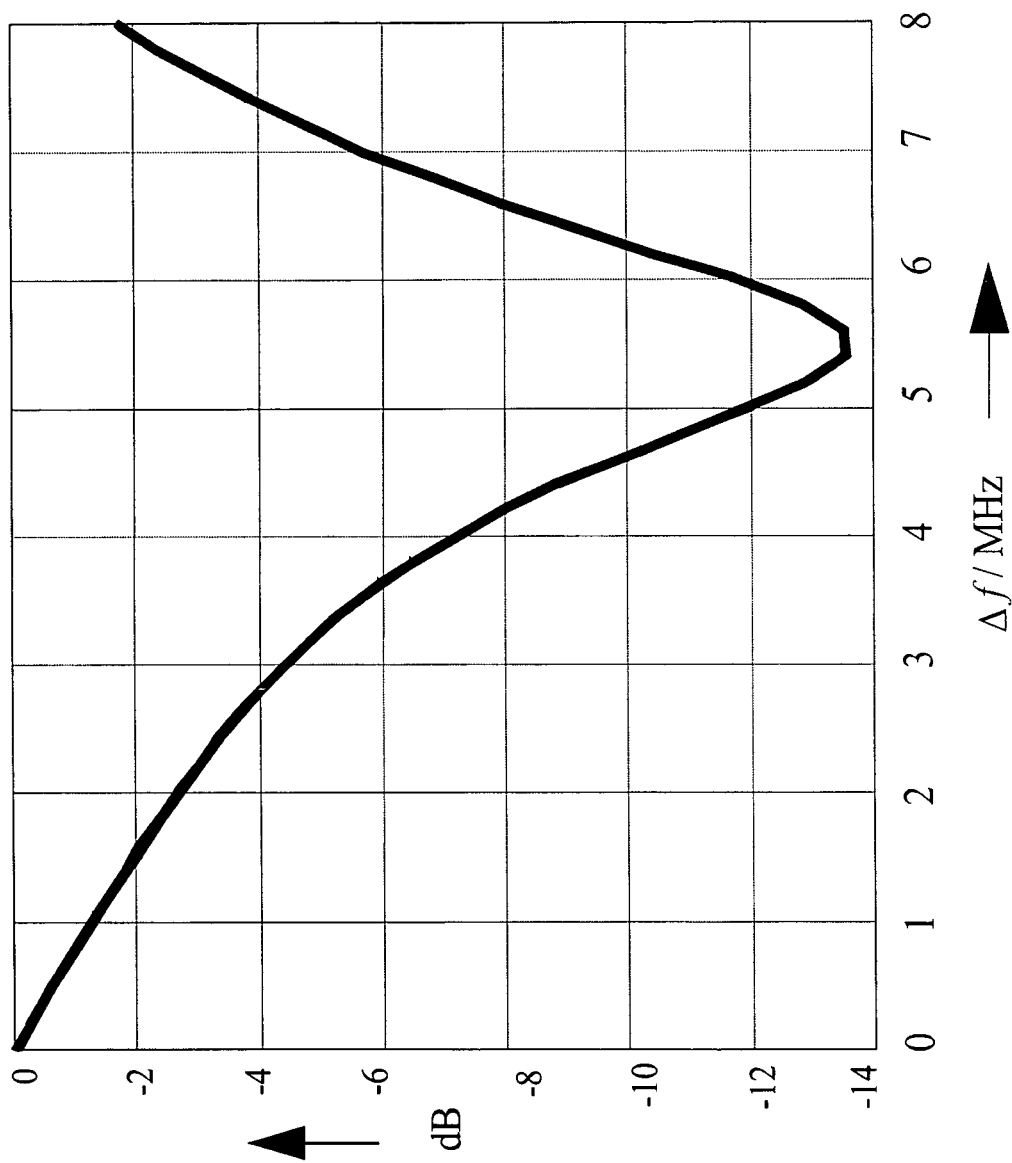

ANTENNA DIVERSITY SYSTEM FOR RELATIVELY BROADBAND BROADCAST RECEPTION IN VEHICLES

CROSS REFERENCE TO RELATED APPLICATIONS

This application hereby claims priority from German Application DE 10 2007 032 048.7 filed on Jul. 10, 2007, the disclosure of which is hereby incorporated herein by reference in its entirety.

BACKGROUND

At least one embodiment of the invention relates to an antenna diversity system for relatively broadband broadcast reception in vehicles such as motor vehicles. The term Broad band such as mobile broadband can be used to describe various types of wireless high-speed internet access through a portable modem, telephone or other device. Examples of different broadband network standards that may be used, include EV-DO, WiMAX, UMTS/HSPA, or some portable satellite-based systems.

In this case, multi-path propagation leads to narrowing of the bandwidth of the channel from the transmitter antenna to the mobile receiver if the path differences of the electromagnetic wave bundles that arrive at the reception location are not small enough to be ignored. Therefore, there is a dependence in frequency at a reception location that is similar to the one observed at a fixed frequency over the driving path. This dependence is illustrated in FIG. 2a, in a wave field with Rayleigh distribution, in a two-dimensional representation.

Particularly in the case of relatively broadband broadcast reception, whose channel width is greater than the bandwidth of the transmission channel as a result of multi-path reception, this phenomenon leads to interference that is known from television reception in vehicles. FIG. 2c shows the level distribution at a location, plotted above the frequency, and shows that a reception minimum exists at a frequency deviation of about 5.5 MHz from the video carrier, for example. In the case of a diversity system according to the scanning method, an antenna that is selected for good reception of the video carrier therefore cannot receive the audio carrier equally well. For this reason, the signals of a multi-antenna system are separated, in the European patent EP 0521 123 B1 which is also published in corresponding U.S. Pat. No. 5,313,660, to Lindenmeier et al which issued on May 17, 1994 the disclosure of which is hereby incorporated herein by reference in its entirety. This patent disclosure shows the signals of the multi-antenna system are separated by means of separate use of a diversity system for video and audio reception, in each instance.

Nevertheless, the disadvantage remains that the video signal components that lie far away from the video carrier are reproduced only deficiently. In the case of digitally modulated, relatively broadband transmission methods, in particular—such as the DVBT method (Digital Video Broadcasting Terrestrial) and the DAB method (Digital Audio Broadcasting)—the loss due to non-detectable symbols at elevated bit error rates frequently has such an effect that the broadcast connection breaks off.

Thus, one benefit of the invention is that it creates a particularly efficient antenna diversity system, which avoids the disadvantages connected with an overly low bandwidth of the transmission channel, to a great extent.

SUMMARY

The particular advantage of an antenna diversity system according to one embodiment of the invention comprises in making do with only one reception tuner and being able to select one signal from a plurality of antenna signals A1, A2, ... AN, with great probability, whose signal components lie above the level necessary for interference-free reception, over the entire channel bandwidth B. This advantage is particularly decisive for transmission according to the modern OFDM methods (orthogonal frequency division multiplexing), such as in the case of television transmissions according to the DVBT method and radio transmissions according to the DAB method. In both cases, the signals are transmitted by means of a plurality of sub-carriers disposed equidistantly in frequency and MPSK-modulated (i.e. BPSK, QPSK, 8PSK, etc.), in each instance. In this connection, modulated sub-carriers according to the QPSK method (quadrature phase shift keying) or also according to the QAM method (quadrature amplitude modulation) are primarily used. In this connection, the channel bandwidth B of a DVBT signal with approximately 6700 sub-carriers, for example, comes to approximately 7.5 MHz. The channel bandwidth B for a DAB signal with approximately 1500 sub-carriers having a distance of 1kHz comes to approximately 1.5 MHz.

It turns out that the assured bandwidth of the transmission channel from the transmission antenna to the mobile receiver, in the case of Rayleigh distribution, is not less than 0.6 MHz if the running path differences are not greater than 100 m. However, this bandwidth is very small as compared with the requirements for mobile digital TV reception, and also for digital radio reception.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION

Figure 1:
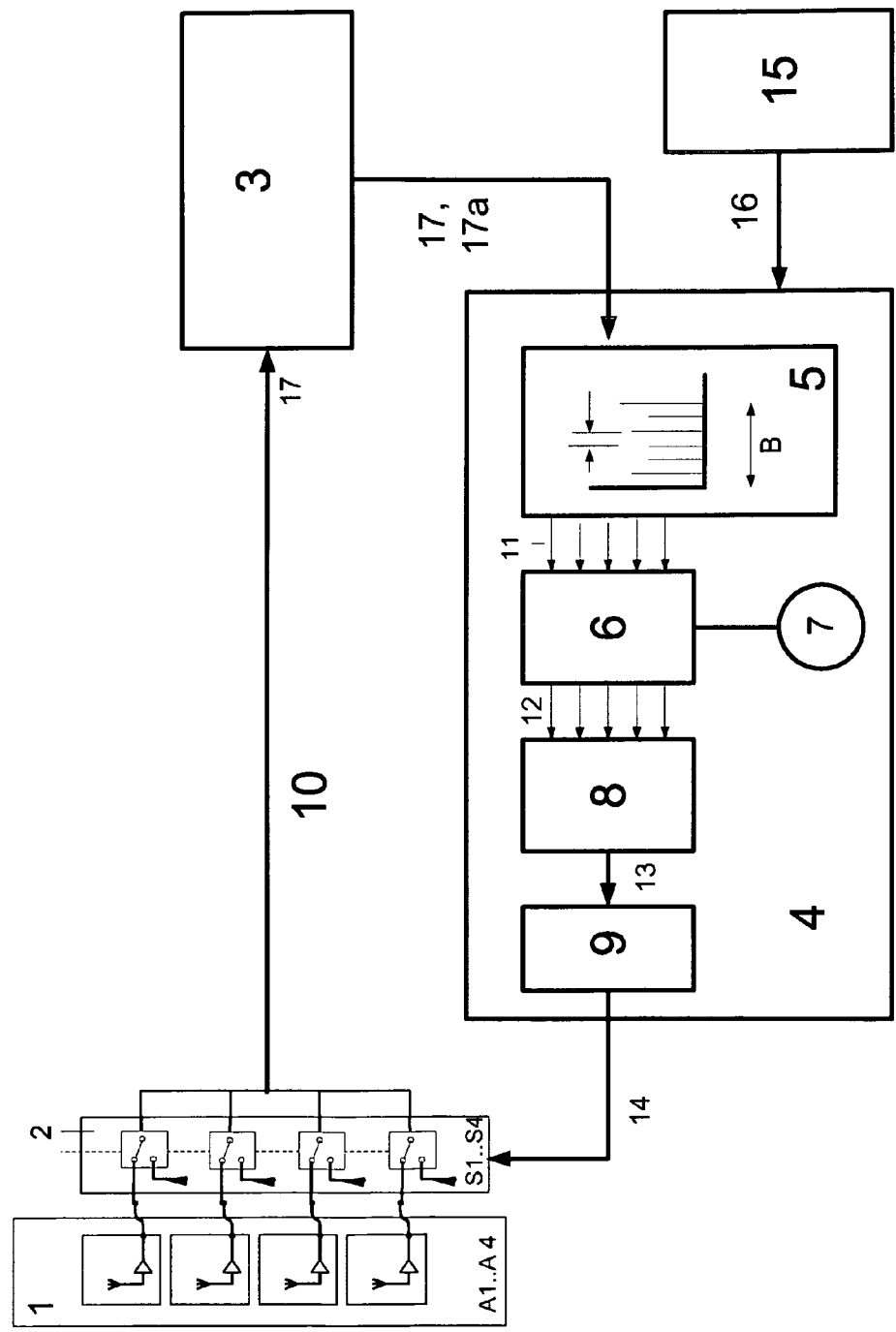
FIG. 1 is a schematic block diagram of one embodiment of an antenna diversity system.
Figure 2A:
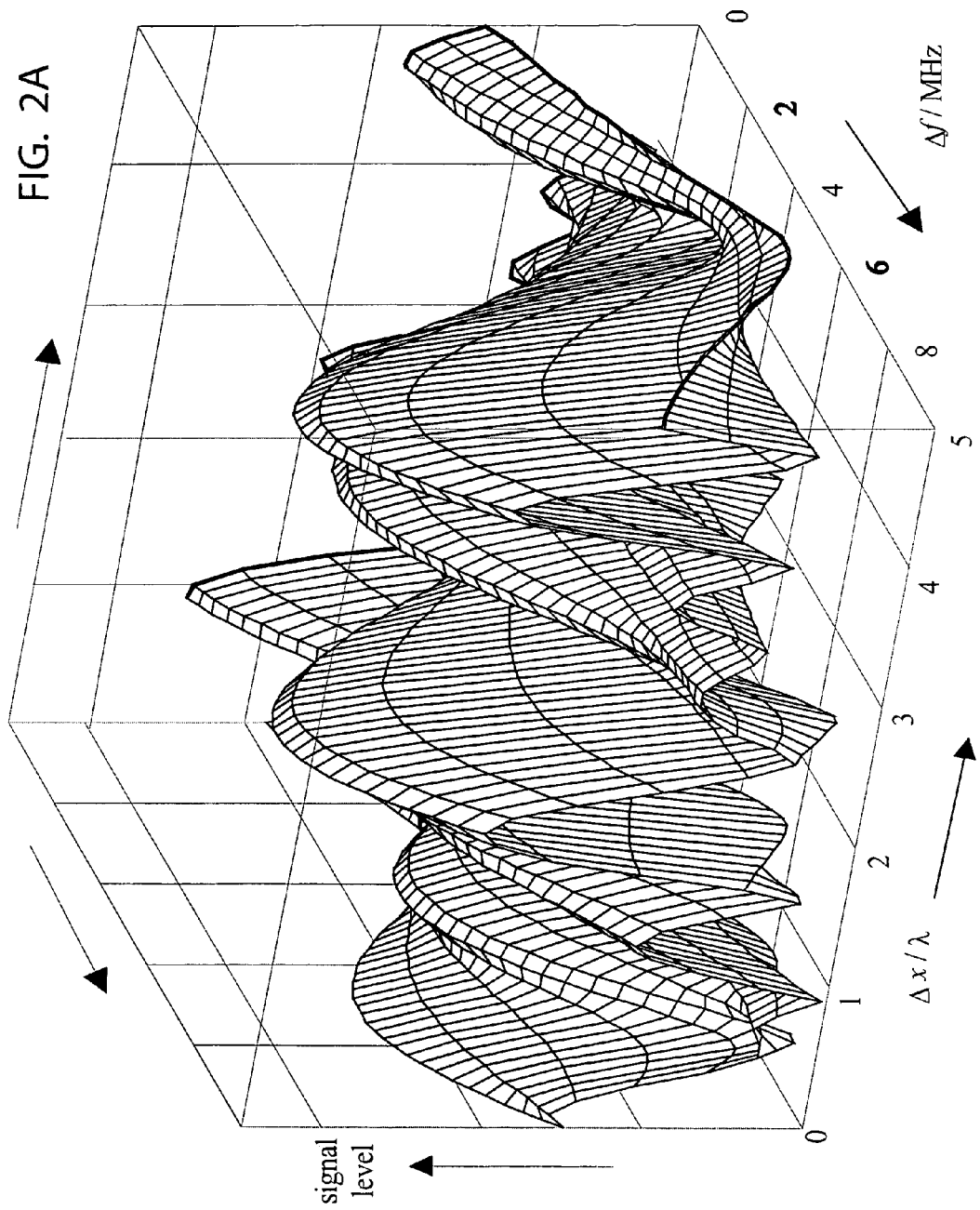
FIG. 2 is a representation of the reception signal levels in the case of Rayleigh multi-path reception, with running path differences, over location and frequency
Figure 2:
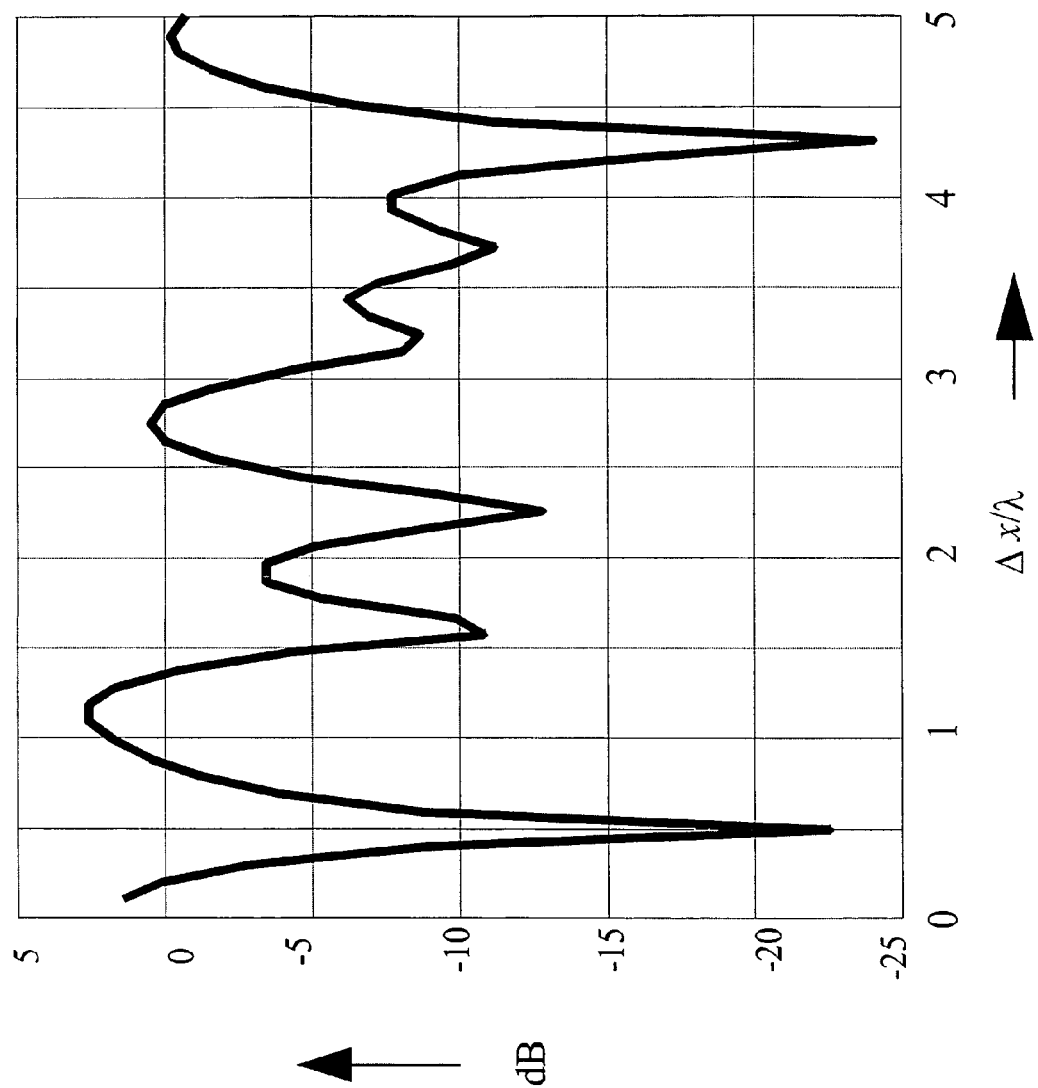

Referring to the drawings, FIG. 1 shows an antenna diversity system comprising a multi-antenna system 1, having its output passed to a signal selection switch 2. Signal selection switch has its output passed to an input of receiver 3. Receiver 3 passes its output to a diversity processor 4. In addition, there is a clock generator 15 which also has its output passed to diversity processor 4. Diversity processor 4 comprises a frequency-interval-selective level detection circuit 5 of reception signal 17. In this case, the output signals of circuit 5 are compared with the signal level threshold 7 in a frequency-interval-selective level evaluation circuit 6. Circuit 6 passes its output to determination circuit 8 which determines an interference rate of reception signal 17, from the deviations. Circuit 8 passes this rate to interference rate memory 9. Memory 9 has address signal generation, in which an address signal is generated and sent to signal selection switch 2 to set signal selection switch 2.

Thus, with this design it is possible with great likelihood, in each instance, to select an antenna signal from a plurality of available antenna signals A1, A2, ... AN, in terms of diversity, in such a manner that none of the received sub-carriers goes below the detectability threshold or to select that antenna signal with a minimum detect ability—errors respectively.

This is achieved, in that reception signal 17 that is present in receiver 3 is passed to diversity processor 4, at a relatively great frequency bandwidth B, preferably in the IF frequency plane, to determine the signal quality of reception signal 17, whose frequency bandwidth B is divided up into frequency intervals Δf. An example of signal quality is explained in greater detail in U.S. Pat. No. 6,236,372 to Lindenmeier et al, which issued on May 22, 2001, the disclosure of which is hereby incorporated herein by reference in its entirety.

In this connection, the frequency bandwidth of the frequency intervals Δf can be as large as necessary, but must be selected to be smaller than the expected bandwidth of the transmission channel. In this way, the levels of the frequency components of reception signal 17 are essentially constant within the frequency intervals Δf, at given reflection conditions, in each instance. A frequency-interval-selective level detection 5 is present in diversity processor 4, which detection separately detects the components of reception signal 17 that occur in the frequency intervals, as frequency-interval-specific level values 11. These components of reception signal 17 are separately compared with a signal level threshold 7 that is required for interference-free reception, in a frequency-interval-selective level evaluation 6, and the interference rate 13 of broadband reception signal 17 is determined by means of evaluation of these measurements over all the frequency intervals Δf. If errors occur, a different reception signal 17, in terms of diversity, is passed to receiver 3, by means of a signal to signal selection switch 2. There is then the possibility of selecting a HF signal 24 having the lowest interference rate 13 in diversity processor 4, by means of selectively switching on all the available antenna signals.

Figure 3:
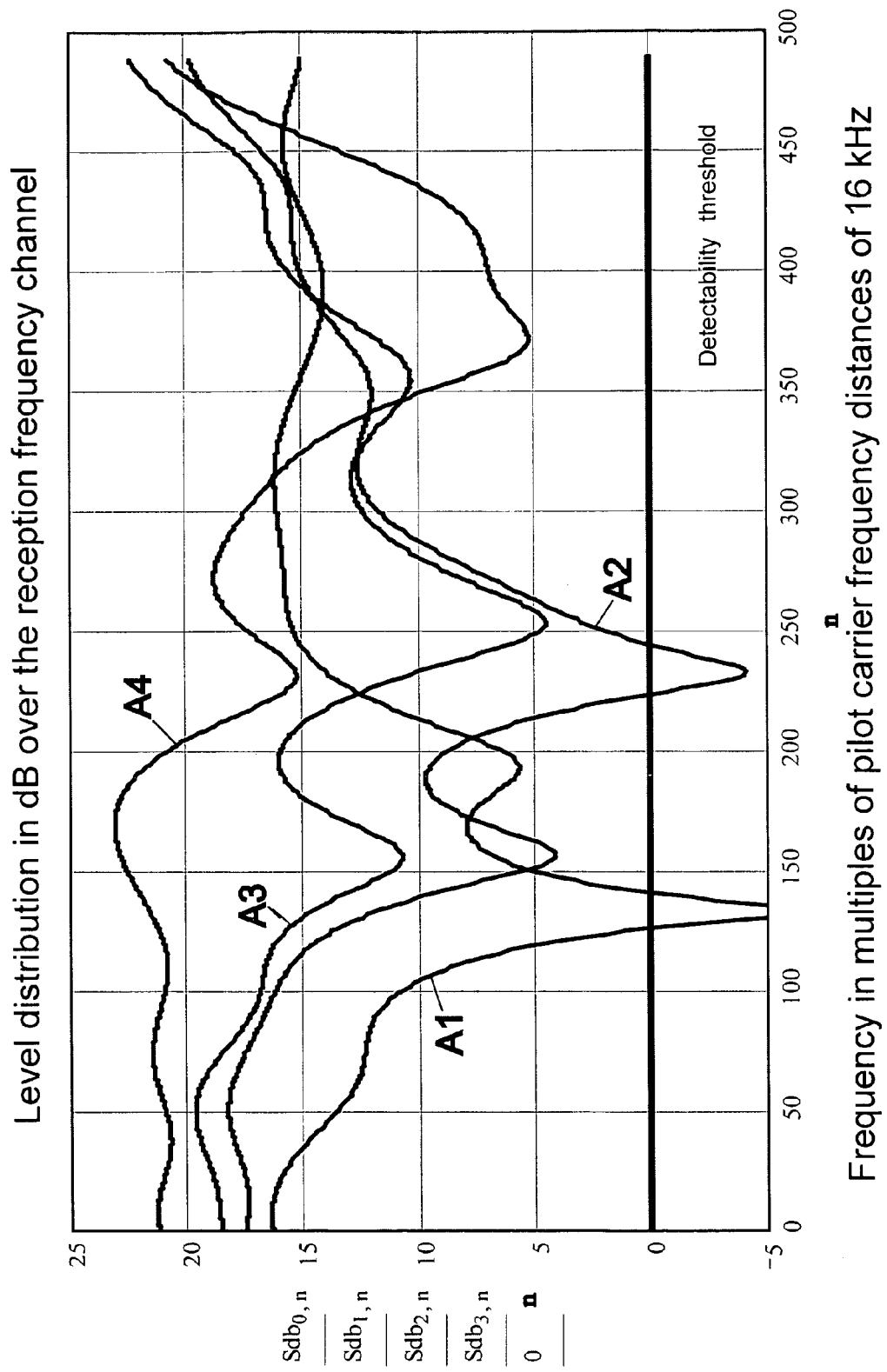
FIG. 3 is a Level distribution over the reception frequency channel of the antenna signals A1 ... A4 over the frequency of the pilot carriers of a DVBT system at a first reception location wherein the pilot carriers of the antenna signals A3 and A4 are all received above the detectability threshold.
Figure 4:
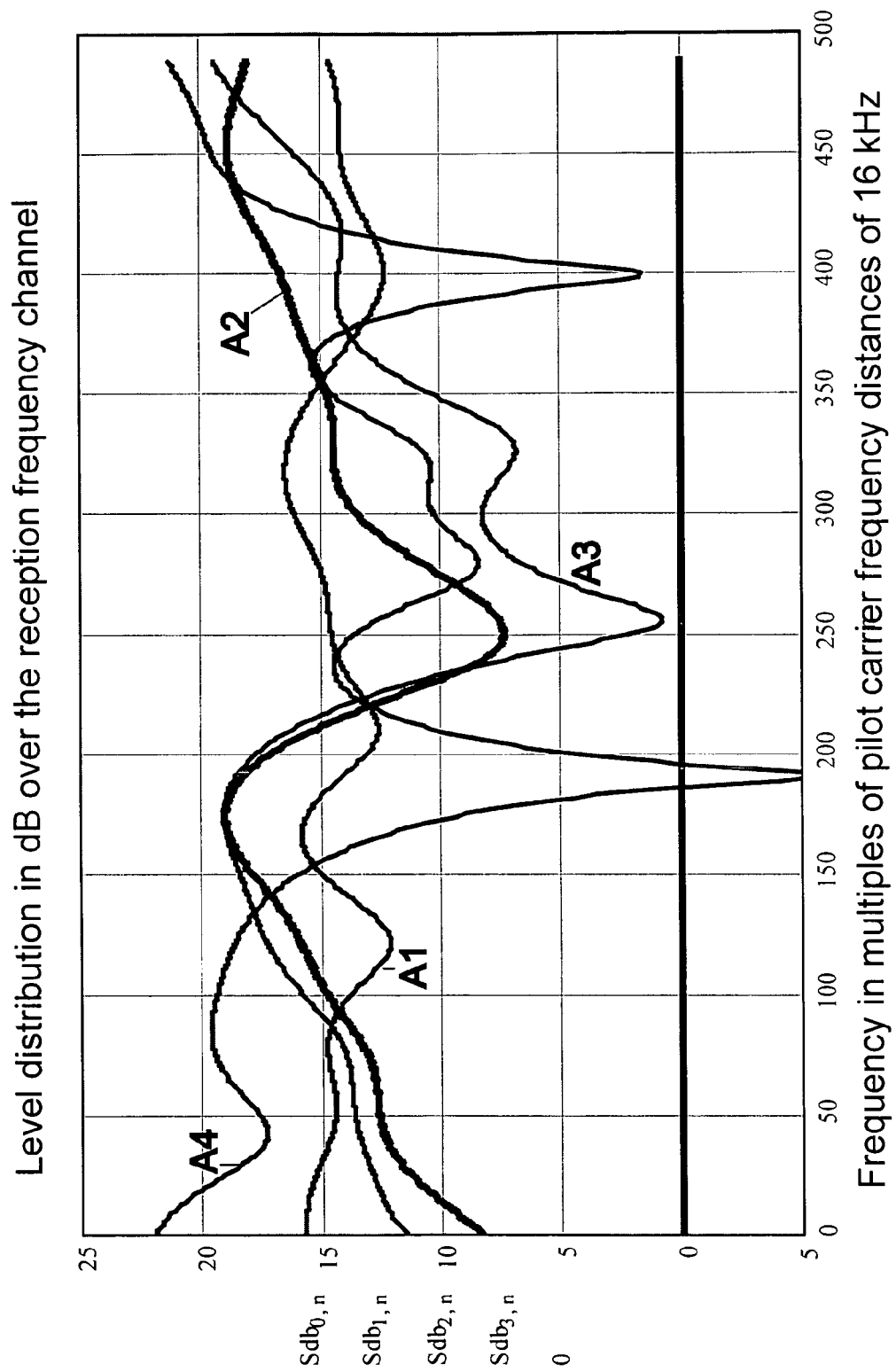
FIG. 4 is a level distribution as in FIG. 3 but at a different reception location, there, the pilot carriers of the antenna signals A1 and A2 are all received above the detectability threshold.
Figure 5:
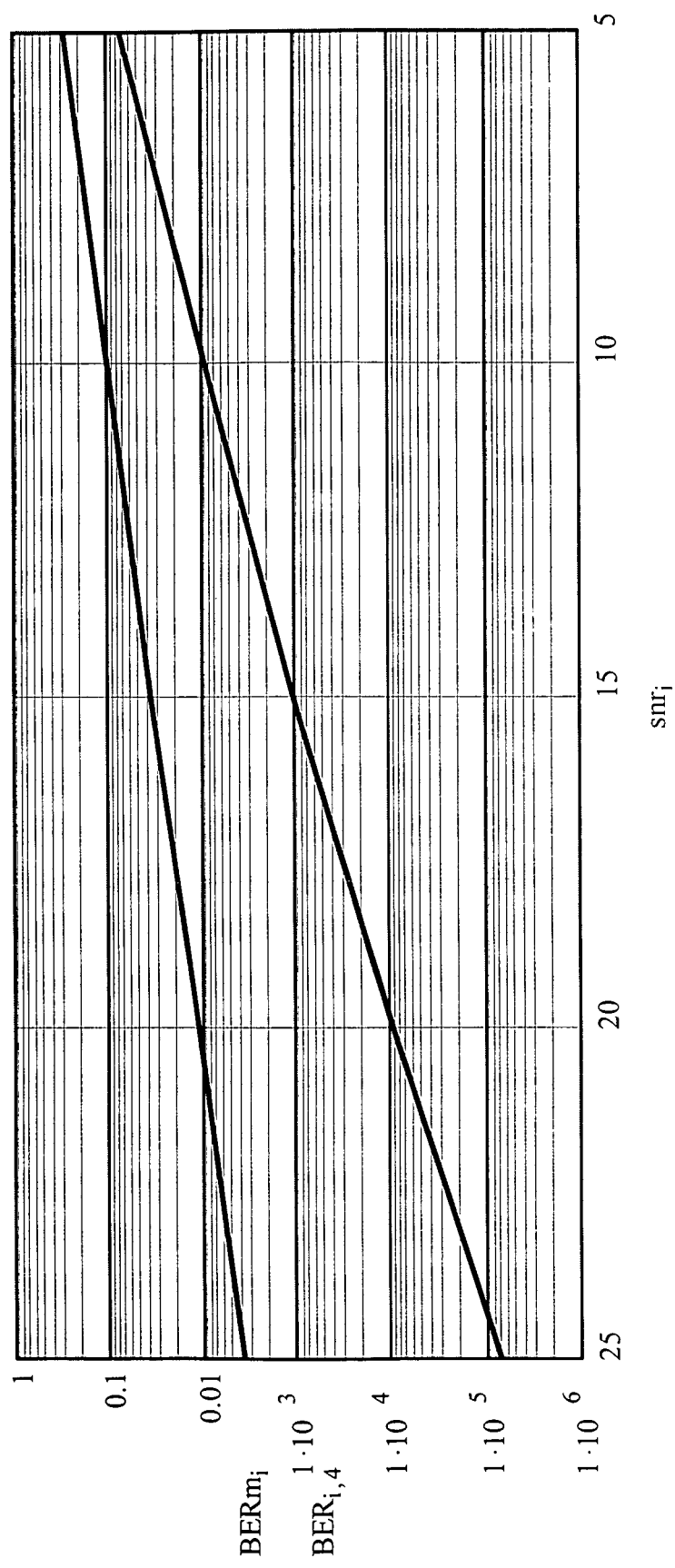
FIG. 5 is an interference probability in the case of propagation profile 100 m/300 m as a function of the signal level threshold for error-free detection without and with antenna diversity with four partially correlated antennas
Figure 6:
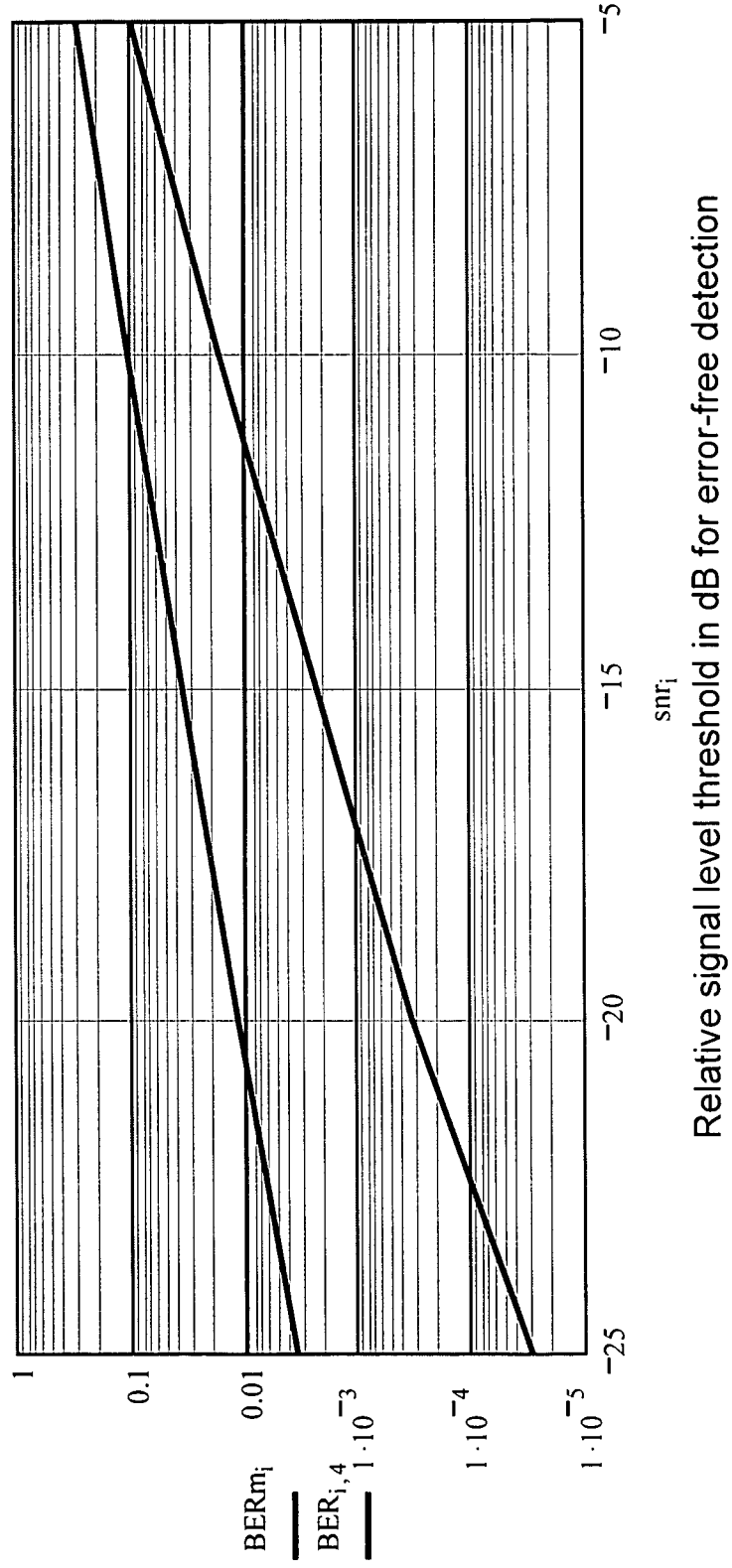
FIG. 6 is an interference probability graph as in FIG. 5 but with a propagation profile 200 m/600 m.
Figure 7:
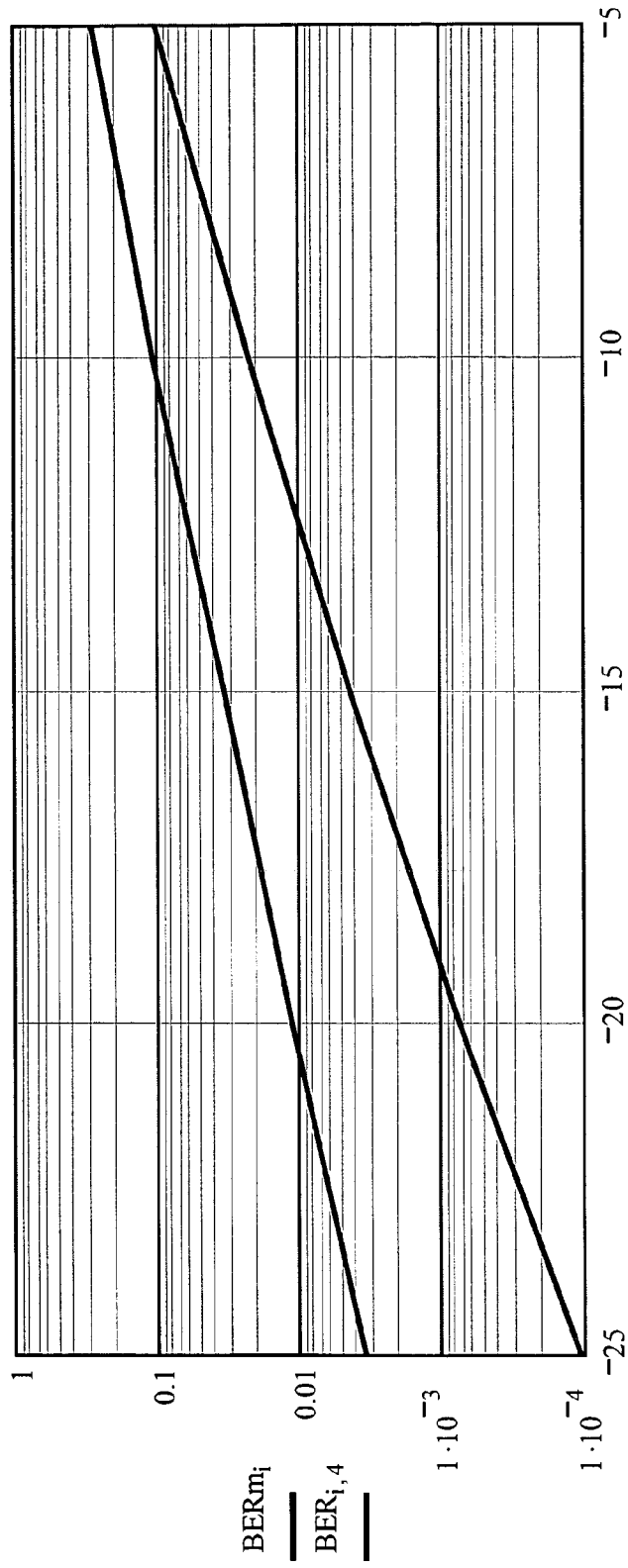
FIG. 7 is an interference probability graph as in FIG. 5 but with a propagation profile 400 m/1200 m.

In the case of TV signals according to the DVBT method, for phase-correct detection of the sub-carriers of the system, for example 489 pilot carriers P are transmitted at a frequency distance of 16 kHz over the entire channel bandwidth. This frequency distance of Δf=16 kHz is particularly suitable for establishing the frequency intervals according to at least one embodiment of the present invention, whereby the level of each received pilot carrier P is treated as a frequency-interval-specific level value 11 according to at least one embodiment of the invention. FIG. 3 shows the level distribution of the pilot carriers over the reception frequency channel for the antennas A1 ... A4. In this connection, a propagation profile for the received wave bundles was assumed, in such a manner that the intensity of the wave bundles decrease with running path differences that become greater. The diagram shown clearly shows, for an instantaneous reception situation at a location, that the antenna signals A1 and A2 lose the corresponding pilot carriers in the range 125 ... 140 and in the range between 225 ... 245, respectively, but that the antenna signals A3 and A4 receive all the pilot carriers without interference. In this way, the sub-carriers, which are situated in the frequency between the pilot carriers, are also received without interference. At a different location, the instantaneous record in FIG. 4 shows a strong frequency dependence of the antenna signal A4, with a loss of the pilot carriers in the range between 180 and 200, and also strong frequency dependencies of the antenna signal A3, while both the antenna signal A2, which previously had interference, and the antenna signal A1 receive all the pilot carriers without interference. For quantification of the reduction in interference probability brought about with the antenna diversity system, the bit error rates are shown in FIGS. 5 to 7 over the required signal level threshold, in dB, for error-free detection of the sub-carriers. The upper curve shows the bit error rate $p_e$ during operation without antenna diversity, in each instance; the lower curve ($p_d$) with antenna diversity, in each instance. Different propagation profiles are assumed in the figures, whereby the first length indication describes the running path difference after which the wave bundles have decreased to 1/e-multiple in intensity, and the second length indication means that wave bundles having a greater running path difference than this value are not relevant. The diversity efficiency is only slightly dependent on the propagation profile, and shows a good value of n=2.1, particularly for the case of 100 m/300 m that frequently occurs in urban areas, and taking into consideration the partial correlation of the antenna signals A1 ... A4. The relationship between the interference probability $p_e$ without antenna diversity and the interference probability $p_d$ with antenna diversity is:

$$P_d = (p_e)^n$$

In a manner analogous to this, in the case of reception of DAB radio signals, the frequency intervals Δf are formed by the plurality of sub-carriers, and the frequency-interval-specific level values 11 of the frequency intervals Δf=approximately 1 kHz defined in this manner are detected by means of the level values of the sub-carriers.

A particular advantage of an antenna diversity system according to at least one embodiment of the invention results from the fact that the diversity efficiency can be further increased, in extremely cost-advantageous manner, by means of formation of linear combinations of the reception signals of the antennas. In this connection, means for phase rotation and amplitude configuration can advantageously be used.

In another advantageous embodiment, the output signals of the frequency-interval-selective level evaluation 6 can be configured as binary signals, and passed to the interference rate determination of the reception signal 17. There, the number of sub-carriers with interference in the case of digital modulation can be determined, for example, in the simplest embodiment. From this, the interference rate 13 of the reception signal 17 can therefore be indicated directly by means of evaluation of the binary signals.

The determination of the interference rate 13 in combination with updating of an advantageously switched-through reception signal 17 can take place, in steps that follow one another closely in time, whereby the time intervals must be selected to be short enough so that the driving path traveled within such an interval does not exceed the length λ/10, if at all possible. The steps that follow one another within a short time are repeatedly initiated, in simple manner, by means of a clock generator 15, by means of the cycle signal 16 of which the determination of the interference rate 13 repeatedly takes place. In order to prevent the cycle signal 16 from occurring during the symbol duration, it is advantageous, to derive the cycle signal 16 from the symbol cycle of the OFDM signal. The DVBT symbol duration, including the guard interval, amounts to approximately 1 ms, depending on the design of the system, for example in 8k mode. It is particularly advantageous, to set up switchover of the antenna signal during the guard interval.

With the goal of establishing a ranking list with regard to the reception quality of the reception signals 17, an interference rate memory with address signal generation 9 is present in the diversity processor 4, in an advantageous embodiment of the invention. The interference rate 13 is stored in it, in each instance, and the current interference rate 13, in each instance, is compared with the interference rates 13 that preceded it in time. The most advantageous antenna signal 17 indicated in the ranking list is passed to the signal selection switch 2 using a correspondingly generated address signal 14, so that of the available reception signals 17, i.e. of the corresponding reception signals 17a in the IF plane, the one having the smallest interference 13 is switched through.

One embodiment of the present invention can be used in particularly advantageous manner for the reception of DVBT-modulated signals. For reliable transmission of such a signal, every tenth sub-carrier, for example, is configured as a pilot carrier, whose phase provides the reference phase for phase detection of the sub-carriers that are adjacent in terms of frequency. The frequency distance between two pilot carriers therefore amounts to approximately 10 kHz, and is small enough to make it possible to consider the transmission channel as being constant over this small frequency bandwidth. The sub-carriers that are situated between the pilot carriers in terms of frequency, whose phase contain the data to be transmitted in the case of QPSK modulation—i.e. also in combination with their amplitude in the case of QAM modulation—can be correctly detected, in this connection, even in a reception field in which interference is caused by multi-path propagation, as long as the pilot carriers are received at a sufficiently great level. A processor for evaluation of these signals is present in every DVBT receiver, which processor can be configured, in advantageous manner, to produce a diversity processor 4 according to at least one embodiment of the present invention, by making some additions that are not very complicated. In this connection, the frequency intervals Δf are formed by the plurality of the pilot carriers disposed at the frequency interval Δf, and the frequency-interval-specific level values 11 of the frequency intervals Δf are determined by means of the level values of the pilot carriers P. The I and Q components are present for evaluating the phase of the pilot carriers P; for example, the amplitude values of the pilot carriers are determined from them, and used to assess the interference rate 13, according to at least one embodiment of the invention.

The amplitude value of a pilot carrier that is determined at reception can be put into relation, in simple manner, with the minimum value that is required for error-free detection of the signal content of the sub-carriers positioned between two pilot carriers, in each instance, in the frequency interval Δf of 10 kHz frequency bandwidth, for example. The interference rate 13 determined for the pilot carriers therefore corresponds to the interference rate of the entire digital reception signal in the reception channel B.

The digital evaluation of the amplitudes of the pilot carriers is, of course, connected with a waiting time (latency), which generally increases with the number of pilot carriers to be detected. In the interests of the least possible circuitry expenditure in connection with the smallest possible waiting time, it is therefore advantageous to select the bandwidth of the frequency intervals Δf to be greater—for example 50 kHz—and to use the amplitude of only every fifth pilot carrier, for example, as the frequency-interval-specific level value 11 to determine the interference rate 13 of the reception signal 17.

Figure 8:
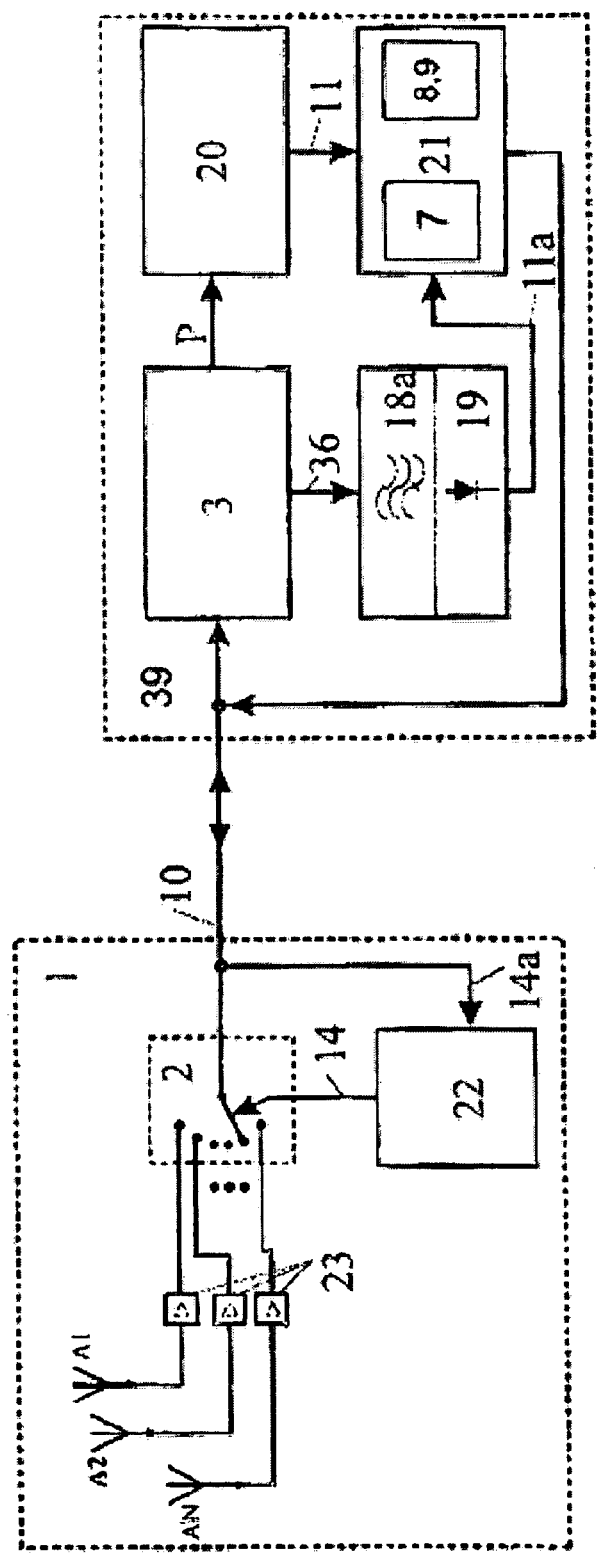
FIG. 8 is a schematic block diagram of another embodiment of the invention.

In FIG. 8, diversity processor 4 shown in FIG. 1 is divided up, in terms of its functions, into an expanded receiver 39 and multi-antenna system 1, which are connected with one another by way of high-frequency line 10. This embodiment evaluates the pilot amplitudes P in a pilot amplitude detection unit 20 and determines the reception power in the reception channel B by means of evaluation of an IF signal 36 for formation of the ranking list. This device is for current selection of one of the reception signals of the antennas A1 . . . AN (with HF amplifier 23 connected, if necessary), by means of microcontroller 21, in which a coded address signal 14a for turning on an address signal generator 22 is generated. These signals are to be passed on by way of high-frequency line 10, and for setting signal selection switch 2, using address signal 14.

Receiver 3 for the OFDM broadcasting systems described above, is generally configured as a superimposition receiver with oscillator signal 27 (See FIG. 9) and IF signal 36, in its basic structure without diversity function, and contains switching units for passing the pilot carriers P on to the pilot amplitude detection unit 20 in FIG. 8. The determination of the interference rate 13 of reception signal 17 takes place in microcontroller 21, with the interference rate determination component 8 contained in it, by means of comparing the pilot amplitudes with a signal level threshold 7. In an expansion of the diversity function described in connection with FIG. 1, in the arrangement in FIG. 8, the signal power within the reception channel B is determined as rough, but very quickly available early data concerning the quality of the antenna signal A1 . . . AN that is currently applied. On the basis of the early data obtained in this manner, the ranking list can be effectively supplemented, in advantageous manner, whereby an antenna signal A1 . . . AN can already be eliminated from the selection, for example, before the determination of the interference rate 13—which is connected with the waiting time that was described, but provides more information—has taken place using the pilot amplitude detection unit 20. Obtaining these early data can take place, for example, in advantageously simple manner, by means of evaluating the IF signal 36 of the receiver 3, using IF broadband band-pass filter 18a with subsequent level detector 19, whose HF-channel-specific level value 11a, available at the output, is used accordingly in microcontroller 21, to form the coded address signal 14a. Address signal 14a is passed to multi-antenna system 1 by way of high-frequency line 10, and an address signal generator 22 generates the address signal 14 to turn on signal selection switch 2 in this system.

Figure 9:
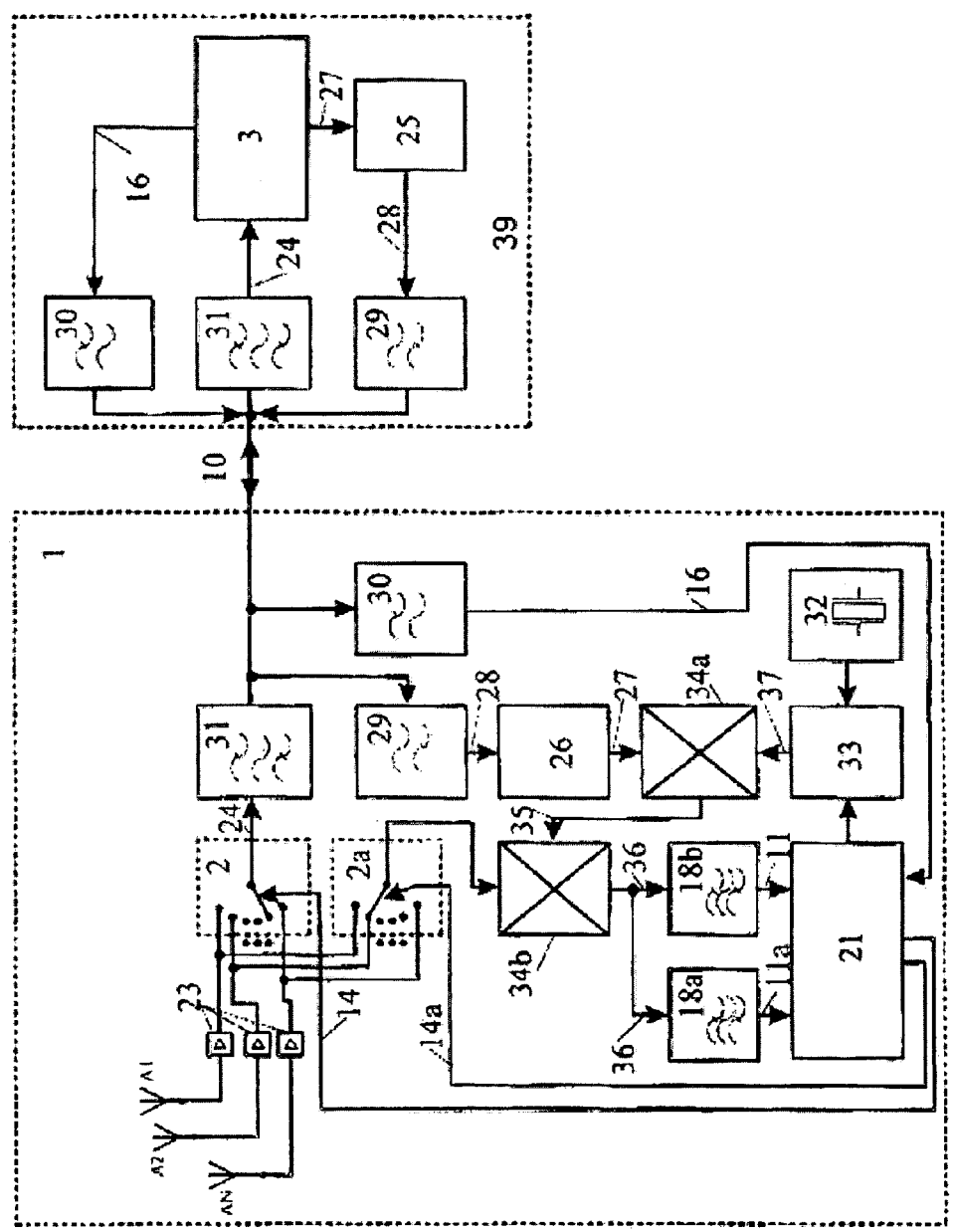
FIG. 9 is a schematic block diagram of another embodiment of the antenna diversity system, with slightly expanded receiver.

FIG. 9 shows receiver 39 and a set-off multi-antenna system 1 having a signal pre-selection switch 2a for cycled determination, which takes place parallel in time to the reception, of a reception-worthy HF signal 24, controlled by microcontroller 21. In this case, the interference rate 13 is determined on the basis of the oscillator signal provided by receiver 39, and the address signal 14 is generated, with which signal the selection of the reception signal 24 takes place, using the cycle signal 16, which is also available in microcontroller 21, correctly in terms of time. In addition, the signal power in the reception channel B is determined as an HF-channel-specific level value 11a, for the purpose of advance information concerning the signal quality of the HF signal 24 in question, by way of the IF broadband band-pass filter 18a.

In the antenna diversity system in FIG. 9, the majority of the diversity functions are accommodated in a separate unit in the multi-antenna system 1, in advantageous manner. This results in the possibility of expanding a receiver 3 that functions according to the basic principle of broadcast reception, with little effort, so that the reception system can optionally be equipped with the diversity function. In the expanded receiver 39, only selection devices 30, 29, 31, are present for this purpose, by way of which the oscillator signal 27, in the form of the oscillator signal of twice the frequency 28, and the cycle signal 16, are passed to the multi-antenna system 1 by way of the high-frequency line 10. There, the address signal 14 for selecting the antenna signal is generated by means of turning on the signal selection switch 2 by a microcontroller 21, in such a manner that a signal pre-selection switch 2a, also controlled by the microcontroller 21. Signal pre-selection switch 2a receives antenna signals A1, A2, ... AN which are passed on to the input side of signal pre-selection switch 2a. These antenna signals A1, A2, ... AN are alternately passed to an IF narrowband band-pass 18b having the bandwidth of a frequency interval Δf, by way of a frequency converter 34b—which, for frequency conversion, is turned on by a frequency interval selection signal 35 for step-by-step detection of the bandwidth of the reception channel B, controlled by microcontroller 21, offset relative to the oscillator signal 27, in terms of frequency, in steps of a multiple of the frequency interval Δf. At the output of the IF narrowband band-pass 18b, a frequency-interval-specific level value 11 of the antenna signal in question is present in the microcontroller 21, in each instance, from which the current address signal 14 and the ranking list are formed. The cycle signal 16 of the digitally modulated HF signals 24 are also passed to the microcontroller 21, so that change-over of signal selection switch 2 can take place at the proper time. This arrangement is connected with the advantage that during reception, it is possible to determine the frequency-interval-specific level values 11 and the interference rate 13 that results from them, as well as the early data concerning the signal quality, with little delay, using fast testing processes of the antenna signals A1...AN, which are carried out parallel in terms of time, and control of signal selection switch 2 can take place with great accuracy, with regard to the most advantageous available HF signal 24.

In an exemplary embodiment of such a system, the oscillator signal 27 is passed to multi-antenna system 1 by way of a frequency doubler 25, an oscillator frequency high-pass 29, and by way of high-frequency line 10, and in the system, it is passed to a frequency converter 34a for superimposition with the VCO signal 37 by way of frequency divider 26, in the original frequency position. The microcontroller 21 controls the voltage-controlled oscillator 33 with reference oscillator 32 step by step, in such a manner that the superimposition with the oscillator signal 27 in the frequency converter 34a results in the frequency interval selection signal 35, which— again superimposed with the antenna signal at the output of the signal pre-selection switch 2a in the frequency converter 34b-yields the frequency-interval-specific IF signal 36. At the output of the IF narrowband band-pass 18b, the frequency-interval-specific level values 11 can be determined by the microcontroller 21, in each instance. The greater the bandwidth of the frequency interval Δf is selected to be, the faster the frequency-interval-specific level values 11 can be determined, and the diversity system can be used at an all the greater driving speed and smaller wavelength of the HF reception signals. On the other hand, the criterion for the selection of an advantageous antenna signal A1 ... AN, derived from the frequency-level-specific level values 11, becomes less accurate with an increasing bandwidth of the frequency intervals Δf. In practice, it has been shown that the bandwidth of the IF narrowband band-pass 18b should therefore not be selected to be greater than 1.5 MHz for a DVBT system. For the diversity system described in connection with FIG. 8, with pilot amplitude detection 20, this accordingly means that the frequency distance between the pilot carriers whose amplitudes are used for determining the frequency-interval-specific level values 11 should not be greater than 1.5 MHz.

To obtain the early data concerning the signal quality of an antenna signal A1, A2, ... AN, as described above, the frequency-interval-specific IF signal 36 is passed to an IF broadband band-pass 18a having the frequency bandwidth of the reception channel B. In order to determine the signal power in the reception channel B, the frequency interval selection signal 35 is adjusted to the frequency of the oscillator signal 27, over the duration of the measurement process, so that the HF-channel-specific level value 11a is present at the output of the IF broadband band-pass 18a, for an evaluation in the microcontroller 21.

Figure 10:
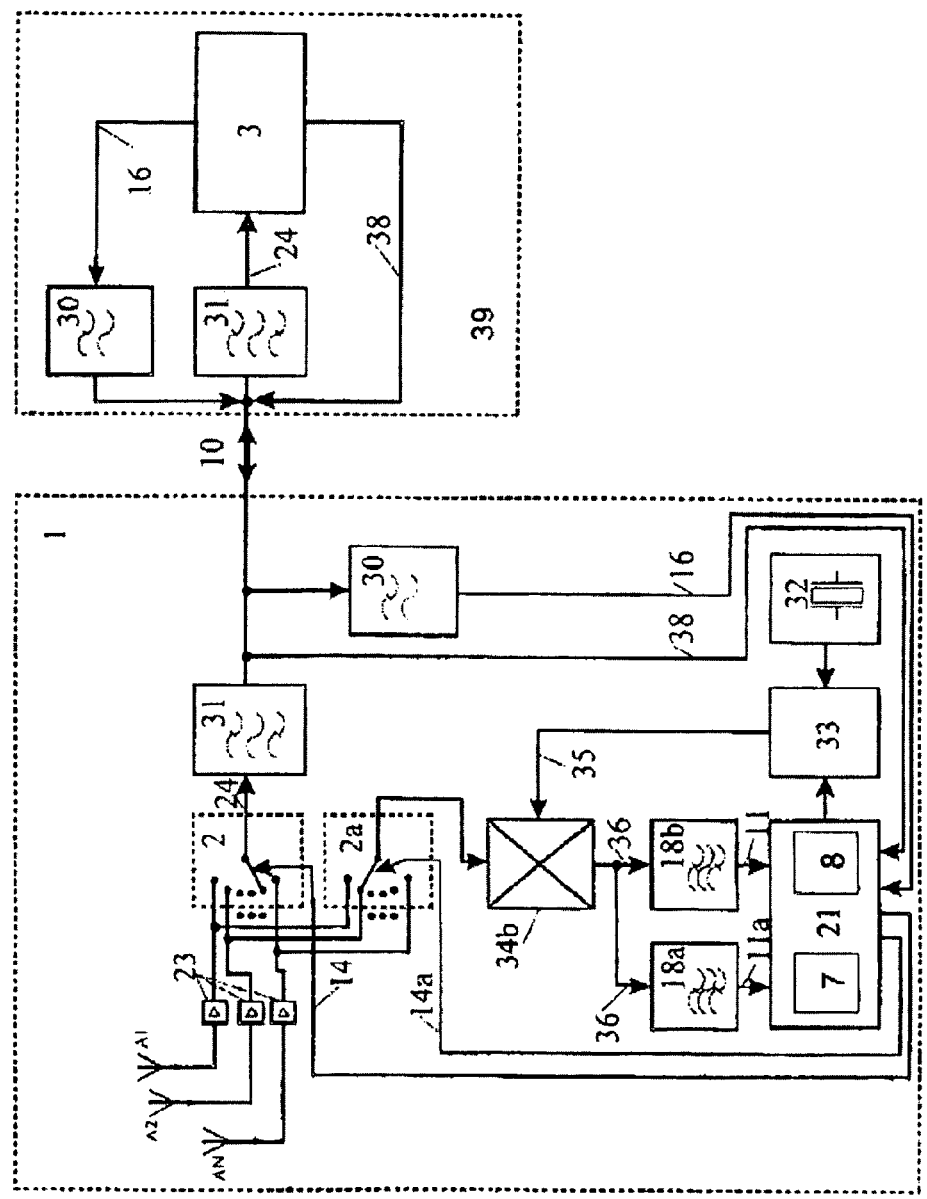
FIG. 10 is another embodiment of an antenna diversity system similar to that as in FIG. 9.

The antenna diversity system in FIG. 10 functions in a manner similar to the system in FIG. 9, but is advantageously simplified in that the frequency of the oscillator signal 27 is passed to the microcontroller 21 in the receiver 3, as a digitally coded oscillator frequency signal 38, by way of the high-frequency line 10. Signal 38 is for controlling the digitally controllable voltage-controlled oscillator 33 that generates the corresponding frequency interval selection signal 35, in each instance, and which is controlled by the microcontroller 21.

Accordingly while only a few embodiments of the present invention have been shown and described, it is obvious that many changes and modifications may be made thereunto without departing from the spirit and scope of the invention.

List of Reference Symbols

Multi-antenna system 1
Signal selection switch 2
Signal pre-selection switch 2a
Receiver 3
Diversity processor 4
Frequency-interval-selective level detection component 5
Frequency-interval-selective level evaluation component 6
Signal level threshold 7
Interference rate determination 8 of the reception signal 17
Interference rate memory with address signal generation 9
High-frequency line 10
Frequency-interval-specific level values 11
HF-channel-specific level value 11a
Interference rate 13 of the reception signal 17
Address signal 14
Coded address signal 14a
Pre-selection address signal 14b
Clock generator 15
Cycle signal 16
Reception signal 17, 17a
IF broadband band-pass filter 18a IF narrowband band-pass filter 18b
Level detector 19
Pilot amplitude detection 20
Microcontroller 21
Address signal generator 22
HF amplifier 23
HF signal 24
Frequency doubler 25
Frequency divider 26
Oscillator signal 27
Oscillator signal having twice the frequency 28
Oscillator frequency high-pass 29
Cycle frequency low-pass 30
HF band-pass filter 31
Reference oscillator 32
Voltage-controlled oscillator 33
Frequency converter 34a
Frequency converter 34b
Frequency interval selection signal 35
Frequency-interval-specific IF signal 36
VCO signal 37
Coded oscillator frequency signal 38
Expanded receiver 39
Antenna signals $A_1, A_2, \ldots A_N$
Bandwidth of the reception channel B
Frequency interval $\Delta f$
Pilot carrier P

What is claimed is:

1. An antenna diversity system for receiving broadcast reception of OFDM—modulated signals in vehicles, said system comprising:
a receiver having an input and an output;
a multi-antenna system having a plurality of antennas and an output comprising an OFDM—modulated reception signal for each of said plurality of antennas;
a signal selection switch having an input for receiving at least two reception signals from said plurality of antennas, said signal selection switch for selection of a different reception signal, in terms of diversity, and wherein said signal selection switch has an output in a form of a selected reception signal which is passed to said receiver; and
a diversity processor, which assesses a signal quality of the selected OFDM—modulated reception signal arriving at said receiver, and which is configured to activate said signal selection switch to pass a different OFDM—modulated reception signal, in terms of diversity, to said receiver, if interference occurs, by switching over, wherein said diversity processor is configured to receive said selected OFDM—modulated reception signal that is present in said receiver, having the greater frequency bandwidth B of the OFDM—modulated reception signal than the expected bandwidth of the transmission channel;
wherein said diversity processor is configured to determine a signal quality of said selected OFDM—modulated reception signal, by dividing its frequency bandwidth B into frequency intervals ($\Delta f$), within which the frequency components of said selected reception signal are essentially constant, in each instance, when multipath-propagation is present,
wherein said diversity processor is configured so that frequency intervals $\Delta f$ are formed by means of a plurality of subcarriers, and wherein a set of frequency-interval-specific level values of said frequency intervals $\Delta f$ are detected by means of the level values of the subcarriers, wherein said processor comprises:
an evaluation circuit wherein said set of frequency-interval-specific level values of said frequency intervals $\Delta f$ of said selected OFDM—modulated reception signal are separately compared with a signal level threshold that is required for interference-free reception, in said evaluation circuit that is a frequency-interval-specific level evaluation of these subcarriers, and the interference rate of said selected OFDM—modulated reception signal is determined by means of evaluation of these measurements over all the frequency intervals ($\Delta f$),
wherein if interference is detected, said processor passes a different reception signal, in terms of diversity, in a form of a different selected OFDM—modulated reception signal having a lowest interference rate, to said receiver.

2. The antenna diversity system according to claim 1, wherein said selected signal, passed to said diversity processor, comprises a reception signal converted into an intermediate frequency channel.

3. The antenna diversity system according to claim 1, wherein additional reception signals are formed from said multi-antenna system by forming linear combinations of the reception signals of said plurality of antennas, wherein said additional reception signals are passed to said signal selection switch (2) to increase a signal variety.

4. The antenna diversity system according to claim 1, further comprising an interference rate determination circuit, wherein a set of output signals of said evaluation circuit are passed, as binary signals, to an interference rate determination of said selected reception signal, in which an interference rate (13) of said selected reception signal is determined by means of evaluation of said binary signals.

5. The antenna diversity system according to claim 1, wherein said diversity processor is programmed to determine said interference rate which occurs in combination with an updating of said selected reception signal, and wherein said diversity processor is advantageously switched through, repeatedly, in steps that follow one another at short time intervals, and that the time intervals are short enough so that the driving distance traveled within such an interval does not exceed the length $\lambda/10$.

6. The antenna diversity system according to claim 1 further comprising a clock generator, wherein said clock generator generates a cycle signal which is output to said diversity processor wherein said diversity processor uses said cycle signal to determine an interference rate.

7. The antenna diversity system according to claim 1, further comprising an interference rate memory with address signal generation wherein said memory stores an interference rate, in each instance, and wherein said diversity processor compares a current interference rate, in each instance, with a set of stored interference rates and wherein said memory has an output comprising an address signal, which is sent to said signal selection switch such that said signal selection switch switches through available reception signals, to select a signal that has a smallest interference rate.

8. The antenna diversity system according to claim 1, wherein said diversity processor is configured to determine an interference rate in combination with an updating of said selected reception signal that is advantageously switched through, repeatedly, in steps that follow one another at short time intervals, and wherein said time intervals are short enough so that a driving distance traveled within such an interval preferably amounts to the length that does not exceed a length of $\lambda/10$.

9. The antenna diversity system according to claim 1, wherein said diversity processor is configured so that frequency intervals ($\Delta f$) are formed by means of a plurality of sub-carriers, and wherein a set of frequency-interval-specific level values of said frequency intervals (Δf) are detected by means of the level values of these sub-carriers.

10. The antenna diversity system according to claim 9, wherein said diversity processor derives a cycle signal from a symbol cycle of the OFDM signal and does not occur during the symbol period but rather at its beginning or end.

11. The antenna diversity system according to claim 10, wherein said diversity processor creates said cycle signal during a guard interval.

12. The antenna diversity system for broadcast reception of DVBT—modulated signals according to claim 1, wherein said diversity processor creates frequency intervals (Δf) which are formed by means of a plurality of pilot carriers (P), and the frequency-interval-specific level values of the frequency intervals (Δf) are detected by means of the level values of the pilot carriers (P).

13. The antenna diversity system for broadcast reception of DVBT-modulated signals according to claim 1, wherein said frequency-interval-selective level detection component (5) is given in such a manner that said frequency intervals (Δf) are formed by means of selected pilot carriers (P), positioned appropriately in the frequency distance of the frequency intervals (Δf), and the frequency-interval-specific level values (11) of the frequency intervals (Δf) which are detected by means of the level value of the pilot carrier (P) are assigned to a frequency interval (Δf).

14. The antenna diversity system according to claim 13, wherein said diversity processor selects a frequency bandwidth of a frequency interval to be not more than 1.5 MHz, in each instance.

15. The antenna diversity system according to claim 14, wherein said diversity processor further comprises an interference rate memory wherein said diversity processor detects separately a reception power of said selected antenna signal (17) within the entire frequency bandwidth of the reception channel B in each instance, to support rapid updating of the ranking list formed by means of said interference rate memory, and wherein antenna signals currently having too low a reception power are only available for selection with a lower rank, by means of placement into the ranking list at a lower rank.

16. The antenna diversity system according to claim 15, wherein said receiver is supplemented with a pilot amplitude detection component, a microcontroller, and an IF broadband bandpass with a level detector, to produce an expanded receiver, and a level of the IF signal at the output of said IF broadband bandpass with said level detector is detected in the form of the HFchannel-specific level value, which, together with the frequency-interval-specific level values, is passed to said microcontroller for updating the ranking list, and for configuring the coded address signal for the antenna signal A1 . . . AN to be selected, and the coded address signal is transmitted, by way of said highfrequency line,
  wherein the device further comprises an address signal generator situated in said multi-antenna system, and coupled to said high frequency line to receive said coded address signal,
  wherein said address signal controls said signal selection switch.

17. The antenna diversity system according to claim 15, further comprising an expanded receiver, having a plurality of selection devices, wherein said expanded receiver has an oscillator signal and whose cycle signal are passed, by way of said selection devices, and by way of said high-frequency line, to said multi-antenna system,
  wherein the device further comprises a microcontroller, in which said address signal for selecting said antenna signal is generated by said microcontroller, by means of turning on said signal selection switch;
  wherein the device further comprises a signal pre-selection switch wherein said microcontroller turns on said signal selection switch so that said signal pre-selection switch is also controlled by said microcontroller, wherein said antenna signals A1 . . . AN are passed on an input side to said microcontroller (21),
  wherein the device further comprises an IF narrowband bandpass and a frequency converter (34b), wherein said selected antenna signals are alternately passed to said IF narrowband band-pass having a bandwidth of a frequency interval Δf, by way of a frequency converter which, for frequency conversion, is turned on with a frequency interval selection signal (35) for step-by-step detection of the reception channel B, controlled by said microcontroller, offset relative to the oscillator signal, in terms of frequency, in steps of a multiple of the frequency interval Δf-so that a its output, a frequency-interval specific level value of the antenna signal in question is present in said microcontroller, in each instance, and the current address signal and the ranking list are formed from this.

18. The antenna diversity system according to claim 16, wherein the device further comprises, an IF broadband bandpass filter for receiving the frequency bandwidth of the HF channel, to which the input signal of the IF narrowband bandpass filter is also passed, and whose output signal, in the case of frequency equality between the frequency interval selection signal and the oscillator signal, supplies the HF-channel-specific level value to the microcontroller, in which, on the basis of this level value, the preliminary decision concerning the possible selection of an antenna signal is made, before the individual frequency-interval-specific level values have been detected.

19. The antenna diversity system according to claim 18, wherein the system is simplified in that the frequency of the oscillator signal is passed to said microcontroller in said expanded receiver, as a digitally coded oscillator frequency signal, by way of said high-frequency line, and wherein the device further comprises a digitally controllable voltage-controlled oscillator, which is controlled by said microcontroller, wherein said corresponding frequency interval selection signal is generated by said digitally controllable voltage-controlled oscillator, in each instance, which is controlled by said microcontroller.

20. An antenna diversity system for receiving broadcast reception of OFDM—modulated signals comprising:
  a) a multi-antenna system comprising a plurality of antennas and an output comprising an OFDM—modulated reception signal for each of said plurality of antennas, said multi-antenna system comprising:
    i) at least one high frequency line;
    ii) at least one signal selection switch having its input coupled to said multi antenna system, and its output coupled to said high frequency line;
    iii) an address signal generator coupled to said high frequency line to receive a coded address signal, wherein said address signal controls said signal selection switch;
  b) a receiver comprising:
    i) a pilot amplitude detector;
    ii) a microcontroller; and
    iii) an IF broadband band-pass with a level detector, to produce an expanded receiver, wherein a level of an IF signal at an output of said IF broadband band-pass with level detector is detected in a form of an HF-channel-specific level value, which, together with a set of frequency-interval-specific level values, is passed to said microcontroller for updating a ranking list, and for configuring said coded address signal for said antenna signal to be selected, and wherein said coded address signal is transmitted, by way of said high-frequency line;

a diversity processor, which assesses a signal quality of the selected OFDM—modulated reception signal arriving at said receiver, and which is configured to activate said signal selection switch to pass a different OFDM—modulated reception signal, in terms of diversity, to said receiver, if interference occurs, by switching over, wherein said diversity processor is configured to receive said selected OFDM—modulated reception signal that is present in said receiver, having the greater frequency bandwidth B of the OFDM—modulated reception signal than the expected bandwidth of the transmission channel; wherein said diversity processor is configured to determine a signal quality of said selected OFDM—modulated reception signal, by dividing its frequency bandwidth B into frequency intervals ($\Delta f$), within which the frequency components of said selected reception signal are essentially constant, in each instance, when multipath-propagation is present, wherein said diversity processor is configured so that frequency intervals $\Delta f$ are formed by means of a plurality of subcarriers, and wherein a set of frequency-interval-specific level values of said frequency intervals $\Delta f$ are detected by means of the level values of the subcarriers, an evaluation circuit wherein said set of frequency-interval-specific level values of said frequency intervals $\Delta f$ of said selected OFDM—modulated reception signal are separately compared with a signal level threshold that is required for interference-free reception, in said evaluation circuit that is a frequency-interval-specific level evaluation of these subcarriers, and the interference rate of said selected OFDM—modulated reception signal is determined by means of evaluation of these measurements over all the frequency intervals ($\Delta f$);

wherein if interference is detected, said address signal generator switches said signal selection switch to pass a different selected OFDM—modulated reception signal, in terms of diversity, in a form of a selected reception signal having a lowest interference rate, to said receiver.

21. An antenna diversity system for receiving broadcast reception of OFDM—modulated signals comprising:
a) a multi-antenna system comprising a plurality of antennas and an output comprising an OFDM—modulated reception signal for each of said plurality of antennas, said multi-antenna system comprising:
i) at least one high frequency line;
ii) at least one signal selection switch having an input coupled to an output of said plurality of antennas, and its output coupled to said high frequency line;
iii) at least one signal pre-selection switch having an input coupled to an output of said plurality of antennas;
iv) a microcontroller, which is configured to control said at least one signal pre-selection switch and which generates and sends an address signal to said signal selection switch for selecting an antenna signal;
v) an IF narrowband band-pass;
vi) a frequency converter, in communication with said at least one signal pre-selection switch, wherein said antenna signals which are passed from said at least one signal pre-selection switch are alternately passed to said IF narrowband band-pass, based upon signals having a bandwidth of a frequency interval $\Delta f$, by way of said frequency converter which, for frequency conversion, is turned on with a frequency interval selection signal for step-by-step detection of a reception channel B, controlled by said microcontroller, offset relative to an oscillator signal, in terms of frequency, in steps of a multiple of the frequency interval $\Delta f$-so that said IF narrowband band-pass outputs a frequency-interval-specific level value of the antenna signal in question to said microcontroller, in each instance, such that said microcontroller generates said current address signal and a ranking list from said frequency-interval-specific level value; and b) a receiver comprising:
i) a plurality of selection devices, wherein said receiver has an oscillator signal and a cycle signal which is passed, by way of said selection devices, and by way of said high-frequency line, to said multi-antenna system;

a diversity processor, which assesses a signal quality of the selected OFDM—modulated reception signal arriving at said receiver, and which is configured to activate said signal selection switch to pass a different OFDM—modulated reception signal, in terms of diversity, to said receiver, if interference occurs, by switching over, wherein said diversity processor is configured to receive said selected OFDM—modulated reception signal that is present in said receiver, having the greater frequency bandwidth B of the OFDM—modulated reception signal than the expected bandwidth of the transmission channel; wherein said diversity processor is configured to determine a signal quality of said selected OFDM—modulated reception signal, by dividing its frequency bandwidth B into frequency intervals ($\Delta f$), within which the frequency components of said selected reception signal are essentially constant, in each instance, when multipath-propagation is present, wherein said diversity processor is configured so that frequency intervals $\Delta f$ are formed by means of a plurality of subcarriers, and wherein a set of frequency-interval-specific level values of said frequency intervals $\Delta f$ are detected by means of the level values of the subcarriers, an evaluation circuit wherein said set of frequency-interval-specific level values of said frequency intervals $\Delta f$ of said selected OFDM—modulated reception signal are separately compared with a signal level threshold that is required for interference-free reception, in said evaluation circuit that is a frequency-interval-specific-level evaluation of these subcarriers, and the interference rate of said selected OFDM—modulated reception signal is determined by means of evaluation of these measurements over all the frequency intervals ($\Delta f$);

wherein if interference is detected, said microcontroller switches said signal selection switch to pass a different reception signal, in terms of diversity, in a form of a selected OFDM—modulated reception signal reception signal having a lowest interference rate, to said receiver.

22. The antenna diversity system according to claim 21, further comprising:
a) an IF broadband band-pass, disposed in said multi-antenna system, said IF broadband band-pass for receiving a frequency bandwidth of an HF channel, to which the input signal of the IF narrowband band-pass is also passed, and whose output signal, in the case of frequency equality between the frequency interval selection signal and the oscillator signal, supplies the HF-channel-specific level value to the microcontroller, in which, on the basis of this level value, the preliminary decision concerning the possible selection of an antenna signal is made, before the individual frequency-interval-specific level values have been detected.

23. The antenna diversity system according to claim 22, wherein said multi-antenna system further comprises:
   at least one digitally controllable voltage-controlled oscillator which is controlled by said microcontroller, and said expanded receiver, sends a digitally coded oscillator frequency signal, by way of said high-frequency line to said microcontroller, and wherein said corresponding frequency interval selection signal is generated by said digitally controllable voltage-controlled oscillator, in each instance.

* * * * *